US006937583B1

(12) United States Patent
Czaja et al.

(10) Patent No.: US 6,937,583 B1
(45) Date of Patent: Aug. 30, 2005

(54) METHOD AND APPARATUS FOR CONTROLLING FORWARD LINK POWER DURING AN INTERGENERATIONAL SOFT HANDOFF IN A CDMA COMMUNICATION SYSTEM

(75) Inventors: Stanislaw Czaja, Cardiff, CA (US); Kraig Lamar Anderson, San Diego, CA (US); Hong Kui Yang, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 857 days.

(21) Appl. No.: 09/783,729

(22) Filed: Feb. 13, 2001

(51) Int. Cl.[7] .............................................. H04Q 7/00
(52) U.S. Cl. ...................... 370/331; 455/436; 455/522
(58) Field of Search ................................. 370/335, 342, 370/331, 332, 333; 455/436–444, 522, 69

(56) References Cited

U.S. PATENT DOCUMENTS

| | | | | |
|---|---|---|---|---|
| 4,901,307 | A | | 2/1990 | Gilhousen et al. ............ 370/18 |
| 5,369,786 | A | * | 11/1994 | Hulsebosch ................. 455/70 |
| 5,862,489 | A | * | 1/1999 | Aalto ......................... 455/522 |
| 6,278,879 | B1 | * | 8/2001 | Western et al. ............ 455/522 |
| 6,496,493 | B1 | * | 12/2002 | Chung ........................ 370/332 |
| 6,594,242 | B1 | * | 7/2003 | Kransmo ..................... 370/331 |
| 6,606,485 | B1 | * | 8/2003 | Chen et al. ................. 455/140 |
| 6,708,041 | B1 | * | 3/2004 | Butovitsch et al. ......... 455/522 |
| 2002/0061749 | A1 | * | 5/2002 | Hunzinger ................... 455/436 |

* cited by examiner

Primary Examiner—Ricky Ngo
Assistant Examiner—Christine Ng
(74) Attorney, Agent, or Firm—Martin J. Jaquez, Esq.; Jaquez & Associates

(57) ABSTRACT

A novel method and apparatus for controlling forward link power when an intergenerational soft handoff is performed in CDMA communication system is disclosed. The forward link power control method and apparatus of the present invention determines acceptable forward link power levels for a selected target base station during intergenerational soft handoff (ISHO) procedures. The method and apparatus of the present invention controls the forward link power for the selected target base station during an ISHO procedure. Open loop and slow forward power control embodiments of the present invention rely upon an observation that information regarding a mobile station serving forward traffic channel can be communicated to the selected target base station using an MSC. In another embodiment, a statistical value can be used to determine a forward link transmit power of a selected target base station. The RTC demodulation embodiment controls forward link transmit power of a target base station by directly demodulating an RTC or FPCC of a mobile station and obtaining power control commands. The method and apparatus of the present invention improves the performance, increases the Quality of Service (QoS), and improves the capacity of CDMA communication systems during complete intergenerational handoff procedures.

25 Claims, 10 Drawing Sheets

METHOD AND APPARATUS FOR CONTROLLING FORWARD LINK POWER DURING AN INTERGENERATIONAL SOFT HANDOFF IN A CDMA COMMUNICATION SYSTEM

BACKGROUND OF THE INVENTION

1. Field of the Invention

This invention relates to CDMA communication systems, and more particularly to methods for controlling forward link power during an intergenerational soft handoff in CDMA communication systems.

2. Description of Related Art

Wireless communication systems facilitate two-way communication between a plurality of subscriber mobile radio stations or "mobile stations" and a fixed network infrastructure. Typically, the plurality of mobile stations communicate with the fixed network infrastructure via a plurality of fixed base stations. Exemplary systems include such mobile cellular telephone systems as Code Division Multiple Access (CDMA) systems, Time Division Multiple Access (TDMA) systems, and Frequency Division Multiple Access (FDMA) systems. The objective of these digital wireless communication systems is to provide communication channels on demand between the mobile stations and the base stations in order to connect the mobile station users with the fixed network infrastructure (usually a wired-line system).

Exemplary CDMA Communication System

Mobile stations typically communicate with base stations using a duplexing scheme that allows for the exchange of information in both directions of connection. In most existing communication systems, transmissions from a base station to a mobile station are referred to as "forward link" transmissions. Transmissions from a mobile station to a base station are referred to as "reverse link" transmissions. These CDMA systems are well known in the art. For example, one such system is described in U.S. Pat. No. 4,901,307, issued on Feb. 13, 1990 to Gilhousen et al., which is hereby incorporated by reference for its teachings of CDMA communication systems.

Basic radio system parameters and call processing procedures for exemplary prior art CDMA systems are described in the TIA specification, entitled "Mobile Station-Base Station Compatibility Standard for Dual-Mode Wideband Spread Spectrum Cellular System," TIA/EIA/IS-95-A, published in May 1995 by the Telecommunications Industry Association, and referred to hereafter as "IS-95A". The update and revision to IS-95A and J-STD-008 (PCS specification analogous to IS-95A) is TIA/EIA/IS-95-B, which was published in March 1999 by the Telecommunications Industry Association (TIA), and is referred to hereafter as "IS-95B". The IS-95A and IS-95B specifications are jointly known as specifying the second generation or "2G" CDMA system. More recently, a third generation, or "3G" CDMA system, is described in the TIA specification, and is entitled "cdma2000 Series", TIA/EIA/IS-2000-A. The TIA/EIA/IS-2000-A specification was published in March 2000 by the TIA, and is referred to hereafter as "IS-2000". The IS-95A, IS-95B and IS-2000 specifications are hereby incorporated by reference for their teachings on CDMA communication systems.

FIG. 1 depicts a simplified depiction of the coverage area in CDMA communication systems having a service area comprising seven base stations controlled by a single MTSO 20. As shown in FIG. 1, a typical CDMA communication system comprises at least one mobile station and a plurality of fixed base stations geographically distributed over the system's service area and controlled by a mobile telecommunications switching office (MTSO) 20. The service area is defined as the geographical area within which a mobile station can remain and still communicate (i.e., maintain a valid radio link) with the CDMA communication system. Each base station provides communication services to a fixed area within the service area. The service area is known as the base station "coverage area". When a mobile station is within a base station's coverage area, the base station is able to provide communication services to the mobile station. A base station that provides service to the mobile is also known as a "serving" base station. The MTSO 20 coordinates all of the switching functions between base stations, mobile stations, and other communications systems (e.g., a Public Service Telephone Network or satellite communication system).

Communication between a base station and a mobile station is established by a negotiation process that is initiated upon call origination. The serving base station begins the negotiation process by assigning a selected one of its available forward traffic channels to the mobile station and thus establishes a forward link with the mobile station. The mobile station then establishes a reverse link with the serving base station. Once communication is established between the serving base station and the mobile station, pilot channels emitted by each base station are used by the mobile station to determine which base station coverage area the mobile station belongs to and the quality of the radio link with the base station. Specifically, each base station transmits an unmodulated pilot channel on a predetermined frequency that aids the mobile stations in detecting signals and measuring signal strengths of nearby base stations.

Power Control in CDMA Communication Systems

Power control is an important operational consideration in CDMA communication systems. A single wideband channel is reused in every cell in a typical CDMA system. For example, in the system of FIG. 1, CDMA cell coverage areas 1–7 operate on a single wideband channel. As is well known in the CDMA communication art, the capacity of CDMA systems capacity is largely limited by interference caused by wideband channel reuse (or frequency reuse). Specifically, system capacity is limited by the interference caused by mobile users transmitting in the same cell and by the interference caused by interferers in other cells. CDMA systems attempt to limit the interference caused by frequency reuse by controlling transmitter output power such that all transmitted signals arrive at a CDMA receiver with equal average power. Specifically, CDMA communication systems dynamically control the power of the mobile station and base station transmitters. When a mobile station changes position relative to its serving base station, its transmitter output power must be adjusted to maintain a transmitter output power equal to the average power level of all transmitted signals. Therefore, power is dynamically controlled. An overview of the dynamic power control used in CDMA communication systems is now described.

FIG. 2 shows a simplified block diagram of an exemplary CDMA communication system. As shown in FIG. 2, the exemplary CDMA communication system comprises a mobile station 10 and a mobile telecommunications switching office (MTSO) 20 controlling a base station 12. The mobile telecommunications switching office (MTSO) 20 controls the mobile station 10 and the base station 12. The MTSO 20 comprises a base station controller (BSC) 22 subsystem and a mobile station controller (MSC) 24 subsystem. The BSC 22 controls all of the base stations that are associated with the MTSO 20. Similarly, the MSC 24 controls all of the mobile stations that are associated with the MTSO 20. The mobile station 10 communicates with the base station 12 (i.e., its serving base station) on a forward traffic channel (FTC) 30 and a reverse traffic channel (RTC) 32. The base station 12 transmits the FTC 30 to the mobile station 10. The mobile station 10 transmits the RTC 32 to the base station 12.

CDMA communication systems control power by sending power control commands between the mobile stations and their associated base stations. Referring to FIG. 2, the base station 12 controls the transmitter power output of the mobile station 10 using the following technique. The base station 12 measures the signal strength of the RTC 32, which is proportionally related to the output power of the mobile station 10. If the base station 12 determines that the signal strength of the RTC 32 requires an adjustment, the mobile station transmitter output power is adjusted according to power control commands transmitted to the mobile station 10. As shown in FIG. 2, the base station 12 transmits power control commands to the mobile station 10 over a reverse power control channel (RPCC) 34. The RPCC 34 is punctured into over the FTC 30. Power output control of the base station 12 is achieved in a similar technique described below.

The base station 12 controls its transmitter power output using the following technique. The mobile station 10 measures the signal strength of the FTC 30, which is proportionally related to the output power of the base station 12. The mobile station 10 transmits the signal strength measurements to the base station 12. If the base station 12 or the mobile station 10 determines that the signal strength of the FTC 30 requires adjustment, the base station transmitter output power is adjusted according to power control commands that are transmitted to the base station 12. As shown in FIG. 2, the mobile station 10 transmits power control commands to the base station 12 using a forward power control channel (FPCC) 36. The FPCC 36 is punctured into the reverse pilot channel.

CDMA Handoffs

CDMA handoffs occur when a mobile station moves from the coverage area of its active base station to the coverage area of a new base station. In typical CDMA systems, a mobile station maintains a list of available base stations for providing communication services to the mobile station. Normally, the mobile station communicates with a base station having the strongest signal. The mobile station receives the pilot signals and determines which pilot signals are the strongest. A "searcher" unit in the mobile station commonly performs the signal detection and strength measurement functions.

The results of the searcher function are reported to the current (i.e., the active) base station. The base station then instructs the mobile station to update a list of available base stations that are maintained by the mobile station. The list is sub-divided into three operative sets—an "active set", a "candidate set", and a "neighbor set". The active set contains a list of the base stations with which the mobile station is currently communicating (typically 1–4 base stations). The candidate set contains a list of base stations that may move into the active set. The neighbor set contains a list of base stations that are being monitored, albeit on a less frequent basis.

As the mobile station moves and its currently active base station signal weakens, the mobile station must access a new base station. Based upon the results of the searcher function, and the instructions received from the base station, the mobile station updates its sets, and communicates with a different base station. In order for communication transmissions to appear seamless to the user of the mobile station, the communication link must be "handed off" to the next base station. A handoff occurs when a mobile station moves across a "boundary line" from a first serving base station coverage area to a second base station coverage area. The communication system "hands over" or transfers service from the first serving base station to the second base station, also known as the "target" base station. A handoff also occurs when a single base station utilizes multiple frequency channels and switches communication between frequency channels. Each pilot channel is identified by a pseudo-random noise (PN) sequence offset and a frequency assignment. Thus, each pilot channel is uniquely identified with a base station that transmits the pilot channel. Pilot channels aid mobile stations in performing handoffs.

Referring again to FIG. 1, each base station services a separate coverage area, represented by a hexagon, and communicates with a specific frequency, a frequency one ($F_1$) or a frequency two ($F_2$), on a single wideband channel. Examples of wideband channels used by CDMA systems include the well-known Cellular (800 MHz) and PCS (1900 MHz) bands. Other wideband channels can be used without departing from the spirit or scope of the present invention. In the exemplary CDMA system of FIG. 1, a first base station 12, located in the middle of a Service Coverage Area One, communicates on a first frequency $F_1$ A mobile station 10 located in Coverage Area One and therefore is serviced by the first base station 12. When the mobile station 10 moves from Coverage Area One to a Coverage Area Two, it performs a handoff procedure from the first base station 12 (the serving base station) to a second base station 14 (the target base station). Thus, the mobile station 10' is serviced by the second base station 14.

There are two basic types of handoffs in CDMA systems: "hard handoffs" (HHO) and "soft handoffs" (SHO). A "soft handoff" or "Make-Before-Break" handoff is a handoff procedure in which the mobile station commences communication with a target base station without interrupting communication with the serving base station. Because mobile stations typically contain only one transmitter, soft handoffs can only be used between base stations with CDMA Channels having identical frequency assignments. Referring again to FIG. 1, a soft handoff procedure is performed when the mobile station 10 travels from a first Coverage Area One to a third Coverage Area Three because the base station 12 and a third base station 16 have identical frequency assignments, $F_1$.

A "hard handoff" is defined as a handoff in which a mobile station commences communication with a target base station after a momentary interruption in communication with a serving base station. Hard handoffs are also referred to as "Break-Before-Make" handoffs. A hard handoff is used when the serving base stations and the target base stations have differing CDMA channel frequency assignments. As shown in FIG. 1, the first base station 12 is assigned a first frequency $F_1$ and the second base station 14 is assigned a second frequency $F_2$. A hard handoff is performed when the mobile station 10 travels from the Coverage Area One to the Coverage Area Two because the first base station 12 and the second base station 14 operate on different frequencies, $F_1$ and $F_2$, as shown in FIG. 1.

A hard handoff can also occur when a single base station utilizes multiple frequency channels and switches communication between frequency channels. For example, a single base station hard handoff can occur between sectors associated with a single base station. The present invention is concerned with the multiple base station scenario, and thus, the single base station scenario is not described in detail herein. However, those skilled in the art shall recognize that the present invention can be utilized equally as well in a single base station scenario.

During a hard handoff, the radio link is momentarily interrupted because a typical mobile station contains only one transmitter and therefore can only demodulate one frequency at a time. Thus, switching from the CDMA channels of the serving base station frequency to the CDMA channels of the target base station frequency produces a momentary interruption in the continuity of the radio link with the CDMA communication system. As described in more detail below, this momentary interruption can result in improper initial power transmissions occurring between a mobile station and its new serving base station. These power transmissions are initially improper because a mobile station and a new serving base station do not have information regarding the others transmitter output power. Improper power transmissions adversely affect a CDMA communication system quality of service and capacity. Intergenerational handoffs are now described.

Intergenerational CDMA Handoffs

Handoffs performed between different generation CDMA systems (e.g., within an intergenerational CDMA system having both 2G CDMA systems and 3G CDMA systems) are known as "intergenerational handoffs" (IGHO). An exemplary intergenerational CDMA system and IHO is described in more detail below with reference to FIG. 3. An IHO can be a soft handoff or a hard handoff. 3G CDMA systems have been designed to provide backward compatibility with 2G CDMA systems at the signaling and call processing level. However, 2G and 3G CDMA systems are not naturally compatible at the physical layer because these systems employ different modulation schemes and spreading rates. Thus, due to the incompatibility between 2G and 3G CDMA systems, problems can occur when performing IHOs. For example, a "complete" Intergenerational Soft Handoff (ISHO) (i.e., a soft handoff on both the forward reverse links) is presently not feasible.

Intergenerational CDMA systems (e.g., CDMA systems comprising both 2G and 3G CDMA systems) can perform forward link ISHOs because mobile stations typically comprise "rake" receivers that are capable of concurrently demodulating multiple signals. Thus, a typical mobile station can simultaneously demodulate a signal from a 2G serving base station and a signal from a 3G target base station. Rake receivers and simultaneous demodulation techniques are well known in the CDMA art and thus are not described in detail herein. However, reverse link ISHOs cannot presently occur because a typical mobile station has only one transmitter. Due to the intergenerational incompatibility described above, the typical mobile station can only communicate simultaneously on the reverse link with base stations of the same generation. Therefore, at the service boundaries between the 2G and 3G systems, a reverse link intergenerational hard handoff (IHHO) has been proposed.

In this type of hard handoff, the connection with a currently active base station (e.g., 2G) is terminated before a new service with a new base station (e.g., 3G) is established. As described in more detail below, this momentary interruption during a reverse link IHHO can result in an improper initial power transmission from the mobile station to its new serving base station. Power control techniques used when performing intergenerational soft handoffs is now described.

Power Control During Intergenerational Soft Handoffs (ISHO)

One of the necessary capabilities of CDMA communication systems is dynamic power control of mobile and base station transmitters. During an ISHO, the CDMA system performs a forward link ISHO and a reverse link IHHO. As described in more detail below with reference to FIG. 3, a reverse link IHHO can result in the occurrence of an improper initial power transmission from the mobile station to its new serving base station, and vice versa.

FIG. 3 shows a simplified block diagram of an exemplary intergenerational CDMA communication system. FIG. 3 is substantially similar to FIG. 2 and thus identical items are not described. As shown in FIG. 3, the exemplary CDMA communication system comprises the mobile station 10 and the mobile telecommunications switching office (MTSO) 20 the MTSO 20 controls the base station 12 (a 2G CDMA system) and a base station 14 (a 3G CDMA system).

The 2G base station 12 communicates with the mobile station 10 using the forward traffic channel (FTC) 30 and the reverse traffic channel (RTC) 32. As shown in FIG. 3, the 2G base station 12 sends power control commands to the mobile station 10 using the reverse power control channel (RPCC) 34. The mobile station 10 transmits power control commands to the 2G base station 12 using the forward power control channel (FPCC) 36. The 3G base station 14 communicates with the mobile station 10 using an FTC 40 and an RTC 42. As shown in FIG. 3, the 3G base station 14 sends power control commands to the mobile station 10 over a reverse power control channel (RPCC) 44. The mobile station 10 transmits power control commands to the 3G base station 14 over a forward power control channel (FPCC) 46.

An ISHO is described with reference to the exemplary intergenerational CDMA system of FIG. 3. Initially, the mobile station 10 communicates with its serving base station 12 over the FTC 30 and the RTC 32. As described above with reference to FIG. 2, the exemplary intergenerational CDMA communication system controls the transmitted power of both the base station and mobile station by transmitting power control commands between the mobile station 10 and the serving 2G base station 12 over the FPCC 36 and the RPCC 34.

The CDMA system initiates an ISHO when the mobile station 10 approaches the coverage area of the 3G base station 14. Thus, a forward link ISHO is performed by establishing communication from the 3G base station 14 to the mobile station 10 via the FTC 40. The forward link is in "soft handoff" because the mobile station 10 simultaneously communicates with the 2G base station 12 and the 3G base station 14. Due to the limitation that typical mobile stations have only one transmitter, the RTC 42 cannot be established while the mobile station 10 is still communicating with the 2G serving base station 12. Thus, the FPCC 46 cannot be established over the RTC 42 until a reverse link IHHO is performed. Disadvantageously, the reverse link IHHO disrupts power control processing, which can result in a severe decrease in the Quality of Service "QoS" of all mobile stations and the overall capacity of the CDMA system. During a reverse link IHHO, the target base station may request a power increase in the RTC of the mobile station because the target base station erroneously measures signal energy from a "nonexistent" RTC. The RTC of the target base station is nonexistent because the mobile station is communicating on the RTC of the serving base station. In response to the target base station request for a power increase in the RTC, the mobile station may increase its RTC power to the serving base station. Also, the target base station may once again measure the nonexistent RTC of the mobile station and will not detect the requested increase in signal energy. In response, the target base station may increase its FTC transmit power because it may assume that the mobile station has an impaired channel condition (i.e., as caused by shadow fading). These improper power conditions may result in the target base station transmitting too much power on the newly formed FTC. The increased power condition may change the power balance at the input of the new serving base station receiver. The new serving base station will, in turn, increase the transmit power of all associated mobile stations. The erroneous power conditions significantly decrease the QoS and capacity of the CDMA system. Thus, it is desirable to provide a method and apparatus for controlling power between two different generations of CDMA systems during intergenerational handoffs. The present invention provides such a method and apparatus for controlling forward link power during intergenerational soft handoffs in a CDMA communication systems.

SUMMARY OF THE INVENTION

The present invention is a novel method and apparatus for controlling forward link power during intergenerational soft handoffs in CDMA communication systems. The forward link power control method and apparatus of the present invention determines acceptable forward link power levels for a target base station during intergenerational soft handoffs (ISHO). The method and apparatus of the present invention then controls forward link power for the target base station during an ISHO. The present invention can utilize one of several embodiments to control forward link power during an ISHO.

The open loop and slow forward power control embodiments of the present invention rely upon the observation that information regarding a mobile station serving forward traffic channel can be relayed to a target base station through an MSC. Specifically, in the open loop embodiment, "Service_fwd_pwr" and "Isho_offset" values are utilized to determine the forward link transmit power of a target base station. In the slow forward power control embodiment, a statistical value such as an "average of a plurality of power control commands" over a time interval can be utilized to determine a forward link transmit power of a target base station. The demodulate RTC embodiment controls forward link transmit power of a target base station by directly demodulating an RTC of a mobile station and obtaining power control command values.

The method and apparatus of the present invention decreases the probability of degrading a CDMA communication system QoS and capacity during a complete intergenerational handoff (i.e., an intergenerational handoff on both the forward and reverse links). Specifically, the present invention decreases the probability of degrading a communication system QoS and capacity when performing intergenerational soft handoffs.

The details of the embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The method and apparatus of the present invention decreases the probability of degrading a communication system QoS and capacity during a complete intergenerational handoff (i.e., an intergenerational handoff in both the forward and reverse link). Specifically, the present invention decreases the probability of degrading a communication system QoS and capacity during intergenerational soft handoffs.

The primary function of the forward link power control method and apparatus of the present invention is to determine acceptable forward link power levels for a target base station during intergenerational soft handoffs (ISHO). The method and apparatus of the present invention controls forward link power for the target base station during an ISHO (specifically, during the forward link ISHO portion of an ISHO). The forward link power control method and apparatus of the present invention uses an inventive forward link power measurement and control process. In accordance with the present invention, a forward link power measurement for a serving base station of one generation is utilized to calculate an initial forward link power level for a target base station of a different generation during an ISHO. The present invention controls subsequent forward link power levels for the target base station during the ISHO.

Several embodiments of the present invention are described. For example, three exemplary methods for controlling forward link power during intergenerational soft handoffs are presented below. These methods can be independently executed within a CDMA communication system to reduce the probability of degrading the system QoS and capacity. The choice of which method to use will depend upon the specific system requirements and available resources within a selected CDMA communication system. Alternatively, all three methods can be used concurrently by a CDMA communication system to verify the results generated by each method, thus providing an improved system and method for performing intergenerational soft handoffs with redundancy.

The present inventive method and apparatus is primarily intended for use in CDMA communication systems. An exemplary CDMA communication system adapted for use in the present forward link power control method and apparatus is described. However, as those of ordinary skill in the art will appreciate, any convenient wireless communication system can be used to practice the present invention provided that the mobile station is capable of measuring radio frequency signal strengths and input power. The present invention can be used in any wireless communication system where increasing service performance during intergenerational soft handoffs is desirable.

Figure 1:
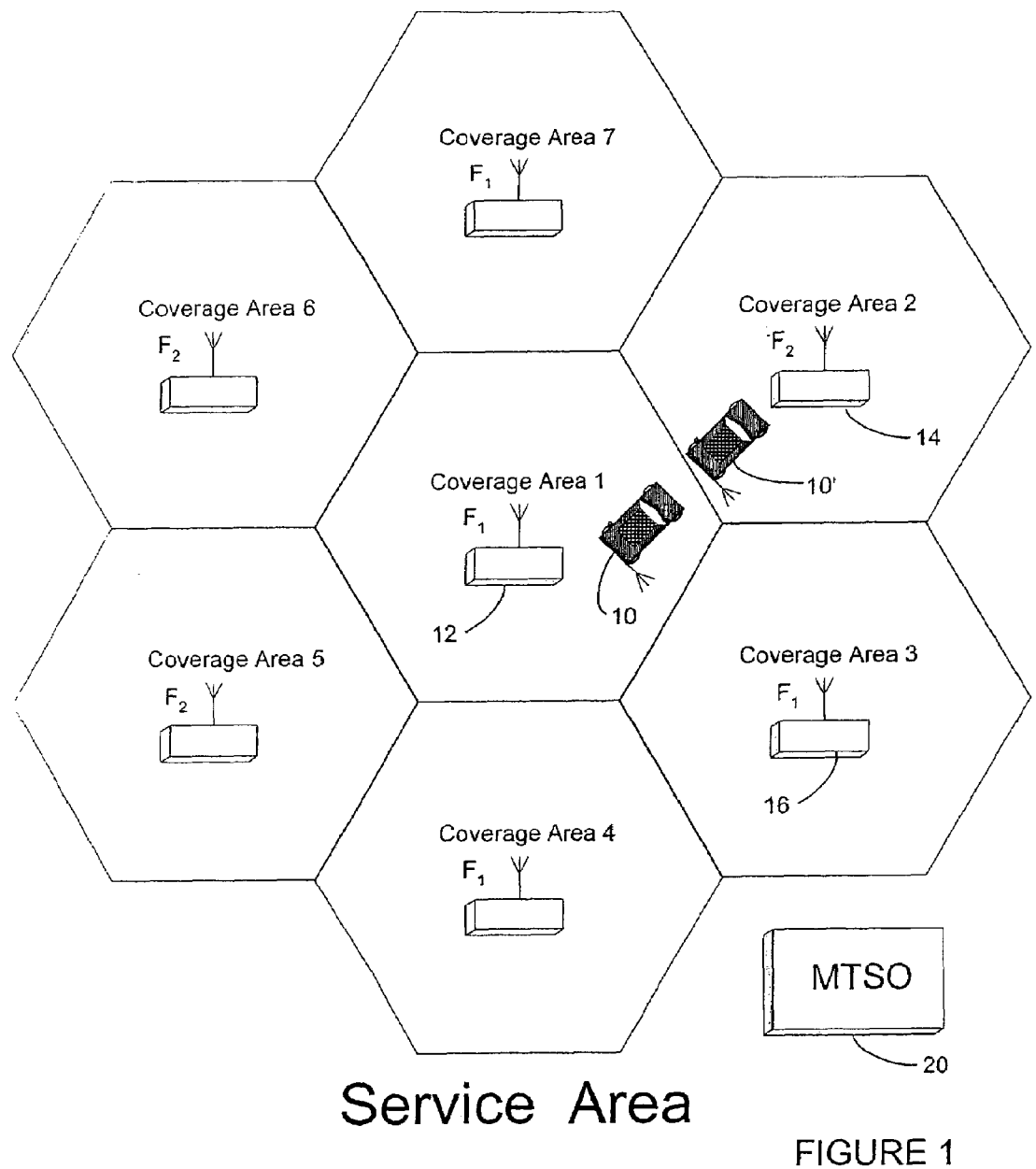
FIG. 1 shows an exemplary CDMA communication system that can be adapted for use in the present forward link power control method and apparatus.
Figure 2:
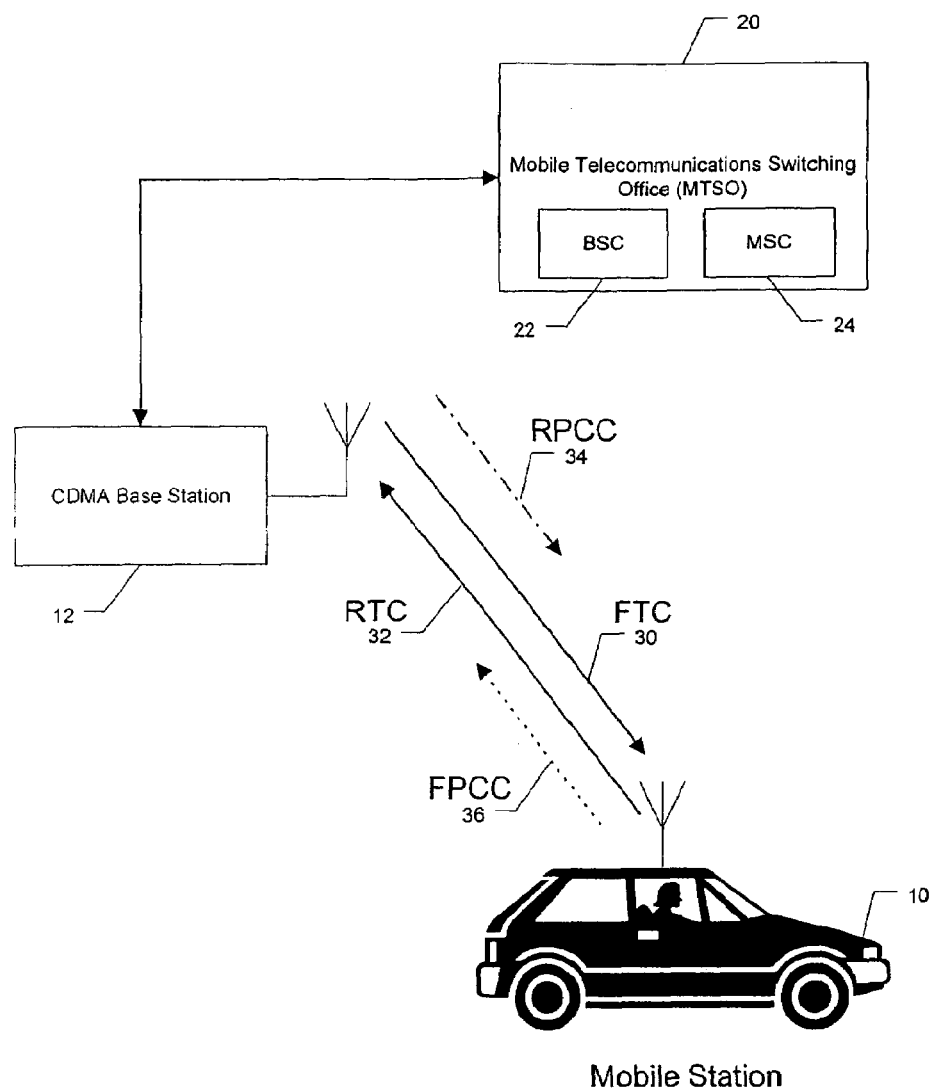
FIG. 2 shows a simplified block diagram of an exemplary CDMA communication system.
Figure 3:
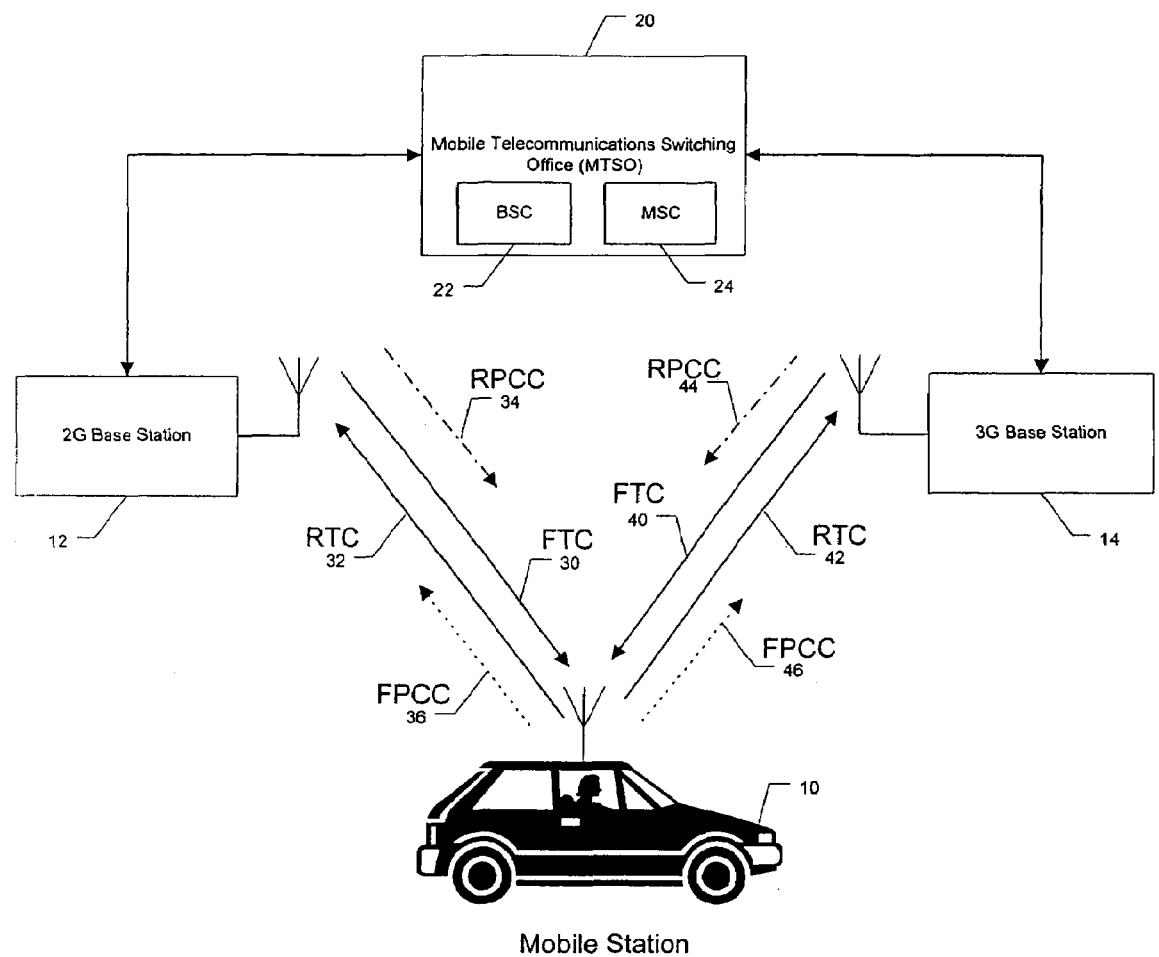
FIG. 3 shows a simplified block diagram of an exemplary intergenerational CDMA communication system.

An Exemplary CDMA Communication System Adapted for use with the Present Forward Link Power Control Method and Apparatus The present inventive method and apparatus is primarily intended for use with CDMA communication systems. However, the system description is not meant as a limitation to the present invention as the invention can be used in any wireless communication system that performs soft handoffs. FIG. 1 shows an exemplary CDMA communication system adapted for use with the present forward link power control method and apparatus. As shown in FIG. 1, the exemplary CDMA communication system comprises a mobile station 10 and a mobile telecommunications switching office (MTSO) 20 controlling a plurality of base stations 12, 14, 16, etc. An exemplary prior art CDMA communication system is described in the incorporated patent, U.S. Pat. No. 4,901,307. Any other convenient wireless communication system can be used to practice the present invention. The mobile station 10 should be capable of tuning to the carrier frequency and measuring signal strength.

Figure 4:
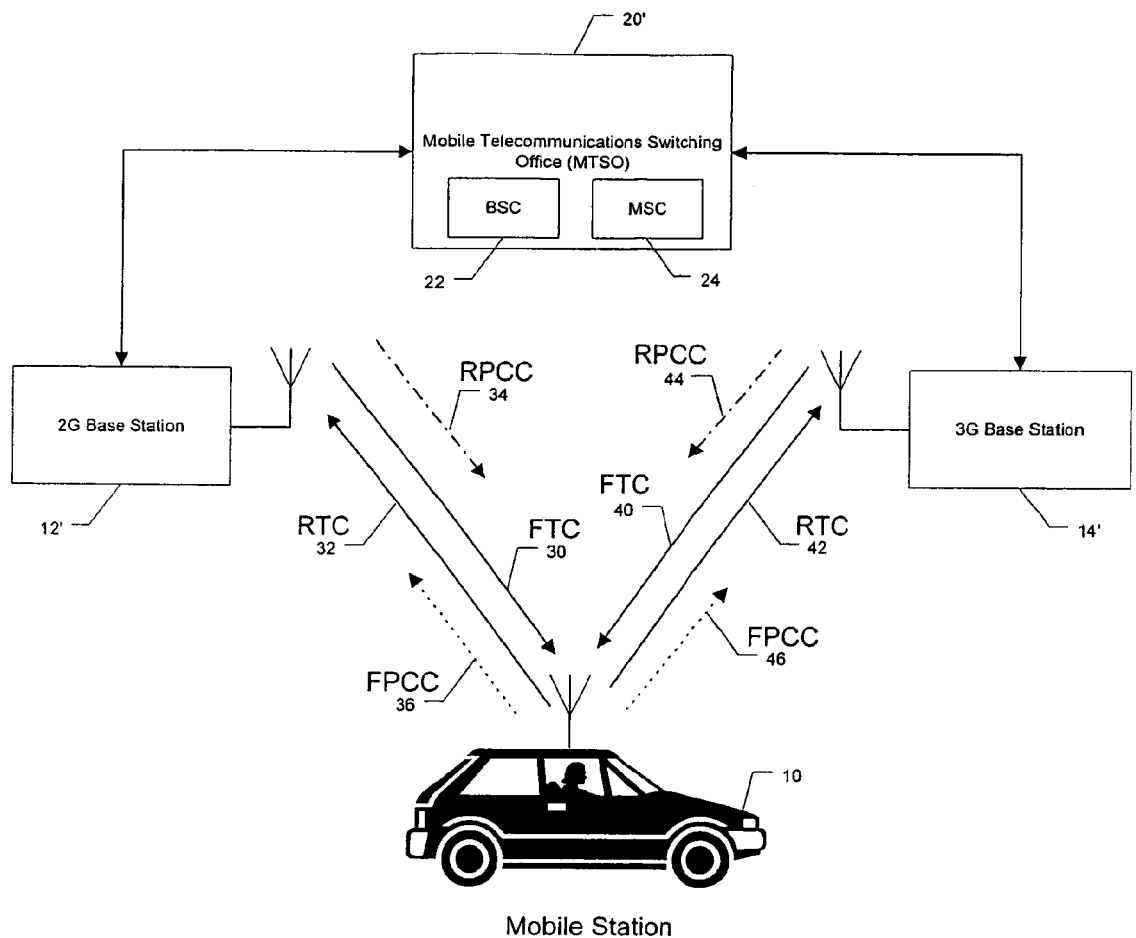
FIG. 4 shows an exemplary intergenerational CDMA communication system adapted for use with the present invention.

FIG. 4 shows an exemplary intergenerational CDMA communication system adapted for use with the present invention. As shown in FIG. 4, the mobile station 10 is disposed on an automobile. However, this is not meant to be a limitation to the present invention. For example, the mobile station 10 may be disposed within a handheld unit, headset unit, or any other mobile station configuration that is well known in the art. Referring again to FIG. 4, the mobile station 10 communicates with a base station 12' or a base station 14' depending upon the base station that is the serving base station. The mobile station 10 receives and transmits data over a radio link to its associated serving base station. When the 2G base station 12' is the serving base station for the mobile station 10, the mobile station 10 receives data over a forward traffic channel (FTC) 30 and transmits data over a reverse traffic channel (RTC) 32. When the 3G base station 14' is the serving base station, the mobile station 10 receives over a forward traffic channel (FTC) 40 and transmits data to the base station 14' via a reverse traffic channel (RTC) 42. A Mobile Telecommunications Switching Office (MTSO) 20' controls the mobile station 10 and the 2G and 3G base stations 12', 14', respectively. The MTSO 20' comprises a Base Station Controller (BSC) 22 subsystem and a Mobile Station Controller (MSC) 24 subsystem. The BSC 22 controls all of the base stations that are associated with the MTSO 20'. Similarly, the MSC 24 controls all of the mobile stations that are associated with the MTSO 20'. An exemplary ISHO is now described in detail.

During an ISHO, an intergenerational CDMA system performs both a forward link ISHO and a reverse link IHHO. As described above, rake receivers are used to facilitate the operation of forward link ISHOs. Referring again to FIG. 4, the mobile station 10 communicates with its associated serving base station, for example, the 2G base station 12'. A radio link comprising the FTC 30 and the RTC 32 is established between the mobile station and the 2G base stations 12'. The BSC 22 and MSC 24 subsystems of the MTSO 20' aid in determining the time instant to initiate a handoff for the intergenerational CDMA system. The MSC 24 communicates with the mobile stations over the FTC of the serving base station.

When the mobile station 10 approaches a target base station, for example, the 3G base station 14', the MSC 24 initiates a forward link ISHO. Thus, the mobile station 10 simultaneously demodulates the FTC 30 of the serving 2G base station 12' and the FTC 40 of the target 3G base station 14'. As described above, an IHHO must occur on the reverse link because a typical mobile station includes only one transmitter. When the MSC 24 initiates a reverse link IHHO, the mobile station 10 must sever the RTC 32 with the serving 2G base station 12' before it establishes the RTC 42 with the target 3G base station 14'.

In order to maintain both the QoS and capacity of the CDMA system, a forward link ISHO should be performed with optimal initial forward link power. However, if the forward link ISHO is performed with too little or much initial power, voice quality degradation or loss of capacity can result. The present invention increases the probability of performing a forward link ISHO at the proper initial forward link power during an ISHO. The present invention can be utilized with any ISHO configuration. Several ISHO configurations are now described. However, the present invention is not limited to the particular ISHO configurations described. Rather, the invention finds application in a variety of ISHO configurations.

The exemplary intergenerational CDMA communication system supports several ISHO configurations. Two basic ISHO configurations (intra-cell and inter-cell) and three special ISHO configurations ("soft", "softer" and "soft-softer") are described hereinbelow. The three special ISHO configurations are types of basic ISHO configurations and thus can be described in terms of the two basic ISHO configurations.

A first basic type of ISHO configuration, referred to as an intra-cell ISHO, is defined as an ISHO performed within a cell that can support both 2G and 3G CDMA communication systems (e.g., a cell served by a 3G base station). A 3G base station performs an intra-cell ISHO by either "handing up" or "handing down" a mobile station. "Handing up" is defined as transferring service from a 2G system to a 3G system. "Handing down" is defined as transferring service from a 3G system to a 2G system.

Figure 5A:
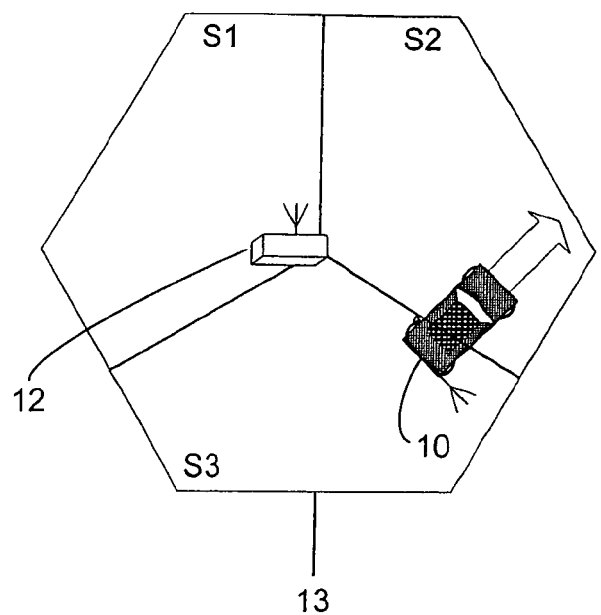
FIG. 5a shows an exemplary intra-cell ISHO scenario.

FIG. 5a shows an exemplary intra-cell ISHO scenario. As shown in FIG. 5a, a cell 13 comprises a coverage area served by a base station 12. The coverage area includes three sectors: sector S1, sector S2 and sector S3. The base station 12 communicates with mobile stations (e.g., a mobile station 10) within the cell 13 using a plurality of directional antennas. Each sector (e.g., sector S2) has an associated set of directional antennas for communicating with mobile stations located within the sector. When a mobile station travels from a first sector to a second sector, its associated base station transfers service, or "hands off" the mobile station from the first sector to the second sector. For example, when the mobile station 10 travels from the sector S3 to the sector S2, the base station 12 "hands off" the mobile station 10 from the sector S3 to the sector S2. The handoff can either comprise a same-generational handoff (e.g., 2G to 2G systems) or an "intergenerational handoff" (e.g., 2G to 3G systems). An intra-cell ISHO occurs when an intergenerational handoff is completed between sectors within a selected cell (e.g., between the sectors S3 and S2 of the cell 13) or within a selected sector (e.g., within the sector S3).

Figure 5B:
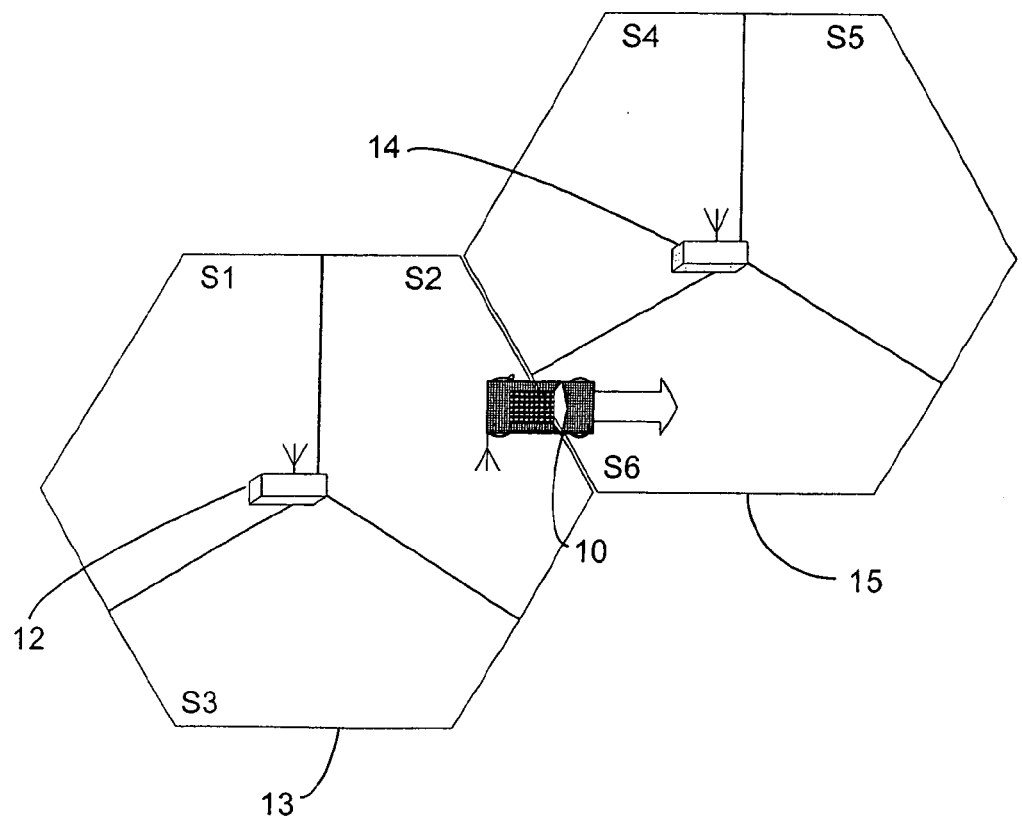
FIG. 5b shows an exemplary inter-cell ISHO scenario.

A second basic type of ISHO configuration, referred to herein as an inter-cell ISHO, is defined as an ISHO performed between adjacent cells using different generation CDMA communication systems (e.g., a 3G cell that is adjacent to a 2G cell). FIG. 5b shows an exemplary inter-cell ISHO scenario. As shown in FIG. 5b, a communication cell 13 comprises a first coverage area and a base station 12. The first coverage area comprises three sectors: sectors S1, S2 and S3. In the exemplary inter-cell ISHO configuration of FIG. 5b, the base station 12 is a 2G base station. An adjacent cell 15 includes a second coverage area and a base station 14. The second coverage area includes three sectors: sectors S4, S5 and S6. In the exemplary inter-cell ISHO configuration of FIG. 5b, the base station 14 comprises a 3G base station. An inter-cell ISHO occurs when the mobile stations travel from a base station operating in a 3G mode to a base station operating in a 2G mode. An inter-cell ISHO also takes place when the mobile stations travel from a base station operating in a 2G mode to a base station operating in a 3G mode. Referring again to FIG. 5b, an exemplary inter-cell ISHO occurs when the mobile station 10 travels from the cell 13 (operating in a 2G mode) to the adjacent cell 15 (operating in a 3G mode).

A first type of ISHO configuration, referred to as a "soft" ISHO configuration, is defined as an inter-cell ISHO that is performed between two cells wherein a serving base station comprises a 2G system and a target base station comprises a 3G system. Referring again to FIG. 5b, a soft ISHO occurs when the mobile station 10 is handed up from the cell 13 (operating in a 2G CDMA mode) to the adjacent cell 15 (operating in a 3G mode). During a soft ISHO procedure, a mobile station simultaneously demodulates the forward traffic channel of both the target base station and the serving base station.

A second type of ISHO scenario, referred to as a "softer" ISHO, is defined as an intra-cell ISHO that is performed between two different sectors within a given cell. Referring again to FIG. 5a, a softer ISHO occurs when the mobile station 10 is handed up from the sector S3 (operating in a 2G mode) to the sector S2 (operating in a 3G mode). Similarly, a softer ISHO occurs when the mobile station 10 is handed down from the sector S3 (operating in a 3G mode) to the sector S2 (operating in a 2G mode). During a softer ISHO, a single base station (e.g., the base station 12 of FIG. 5a) comprises both the serving and the target CDMA systems. Thus, a single power control subchannel can be utilized by both systems because the serving and target CDMA systems are co-located.

A third type of ISHO scenario, referred to as a "soft-softer" ISHO, is defined as concurrent ISHOs wherein a first ISHO comprises a softer ISHO, and a second ISHO comprises a soft ISHO. Specifically, the first ISHO (i.e., the softer ISHO) is performed between a serving 3G system in a first sector of a first cell and a target 2G system in a second sector of the first cell. The second ISHO (i.e., the softer ISHO) is performed between the now-serving 2G system of the second sector of the first cell and a target 3G system in a second cell.

Figure 5C:
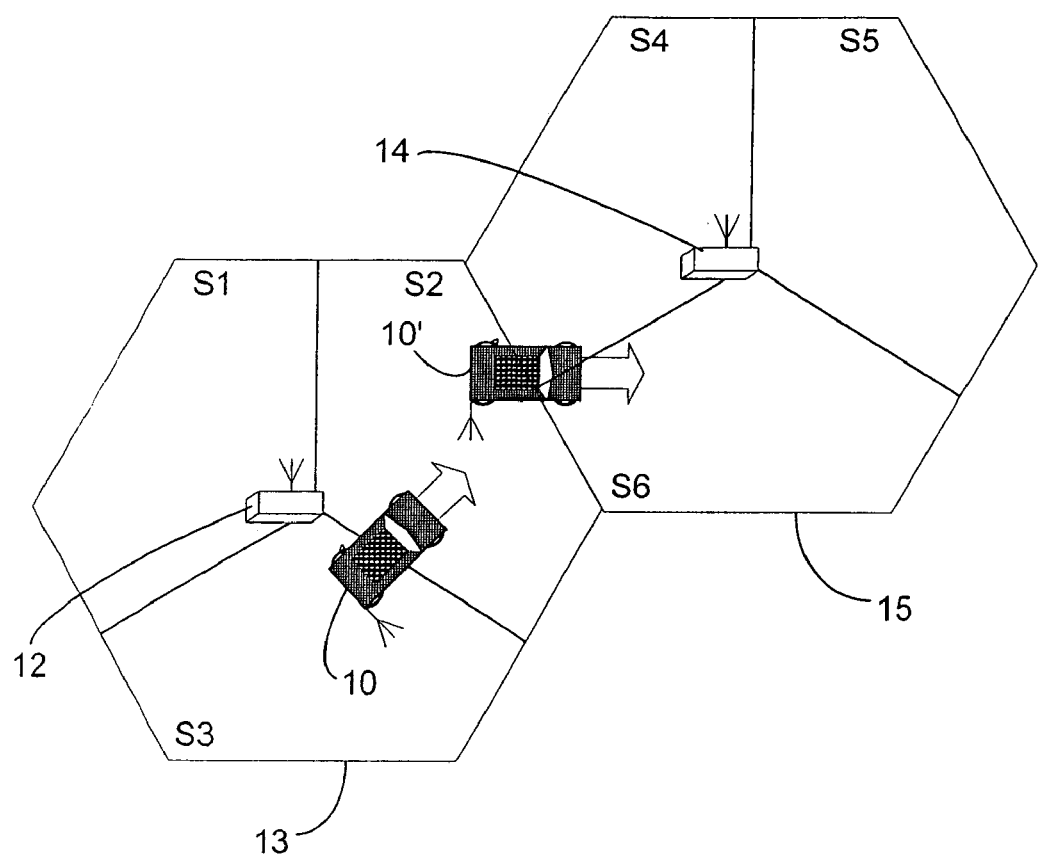
FIG. 5c shows an exemplary soft-softer ISHO scenario.

FIG. 5c shows an exemplary soft-softer ISHO procedure. FIG. 5c is substantially similar to FIG. 5b and like elements therefore are not described. As shown in FIG. 5c, when the mobile station 10 travels from the sector S3 (operating in a 3G mode) to the sector S2 (operating in a 2G mode), the base station 12 performs a softer ISHO procedure. When the mobile station 10 (shown as mobile station 10' in FIG. 5c) subsequently travels from the cell 13 (operating in a 2G mode) to the adjacent cell 15 (operating in a 3G mode), a soft ISHO procedure is performed.

An important function of the forward link power control method and apparatus of the present invention is to determine acceptable forward link power levels for a target base station during an intergenerational soft handoff (ISHO). The method and apparatus of the present invention then controls forward link power for the target base station during an ISHO (specifically, during the forward link ISHO portion of an ISHO). The forward link power control method and apparatus of the present invention achieves this important function using an inventive forward link power measurement and control process. One skilled in the communication art shall recognize that the forward link power control method and apparatus can be used to either control forward link power or to trigger an IHO. Three embodiments of the present invention are now described in more detail below.

Open Loop Embodiment of the Present Invention

The open loop embodiment of the present invention relies upon the observation that information regarding the serving forward traffic channel of a mobile station can be relayed to the target base station through an MSC (e.g., the MSC 24 of FIG. 4). Examples of the information that can be communicated to the target base station include power control commands and forward link power levels. The present open loop embodiment of the present invention can be utilized in ISHOs having intra-cell or inter-cell configurations. Also, the open loop embodiment can be used when handing up (i.e., transferring communication from a 2G to a 3G CDMA system) or handing down (i.e., 3G to 2G) mobile stations.

Figure 6:
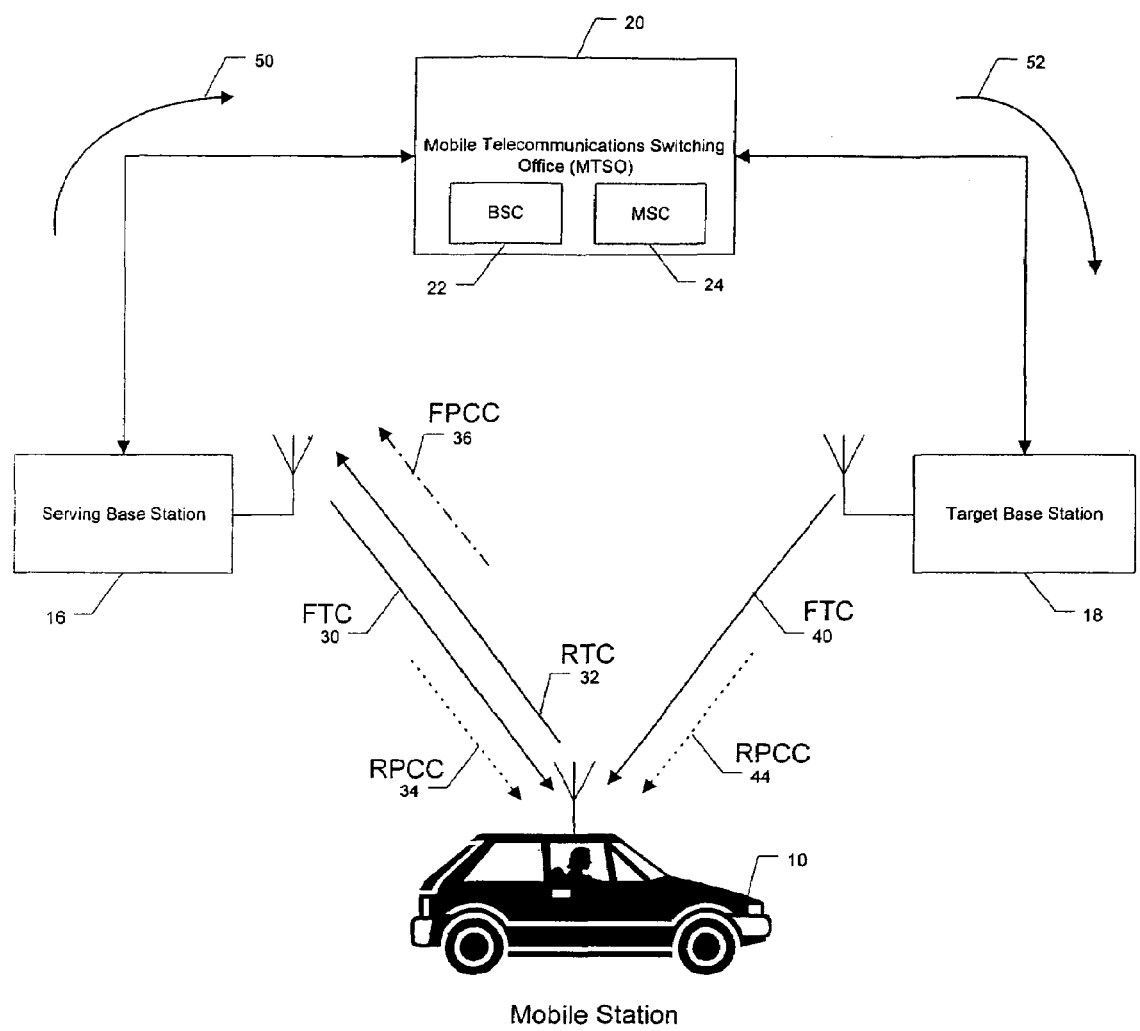
FIG. 6 shows an exemplary intergenerational CDMA communication system adapted for use with an open loop and slow forward power control embodiments of the present invention.

FIG. 6 shows an exemplary intergenerational CDMA communication system adapted for use with the open loop and slow forward power control embodiments of the present invention. FIG. 6 is substantially similar to the exemplary intergenerational CDMA communication system of FIG. 4 and like elements are therefore not described in more detail. As shown in FIG. 6, a serving base station 16 communicates with the mobile station 10 using the forward traffic channel (FTC) 30 and the reverse traffic channel (RTC) 32. The serving base station 16 transmits power control commands to the mobile station 10 over the reverse power control channel (RPCC) 34. The mobile station 10 transmits power control commands to the serving base station 16 via the forward power control channel (FPCC) 36.

Referring again to FIG. 6, a target base station 18 communicates with the mobile station 10 using an FTC 40 during an intergenerational handoff that is performed between the serving base station 16 and the target base station 18. The target base station 18 transmits power control commands to the mobile station 10 via a reverse power control channel (RPCC) 44. The serving base station 16 transmits data to the MTSO 20 using a serving communication link 50. The MTSO 20 transmits data to the target base station 18 via a target communication link 52. An exemplary open loop method of the present invention is now described in more detail.

Figure 7:
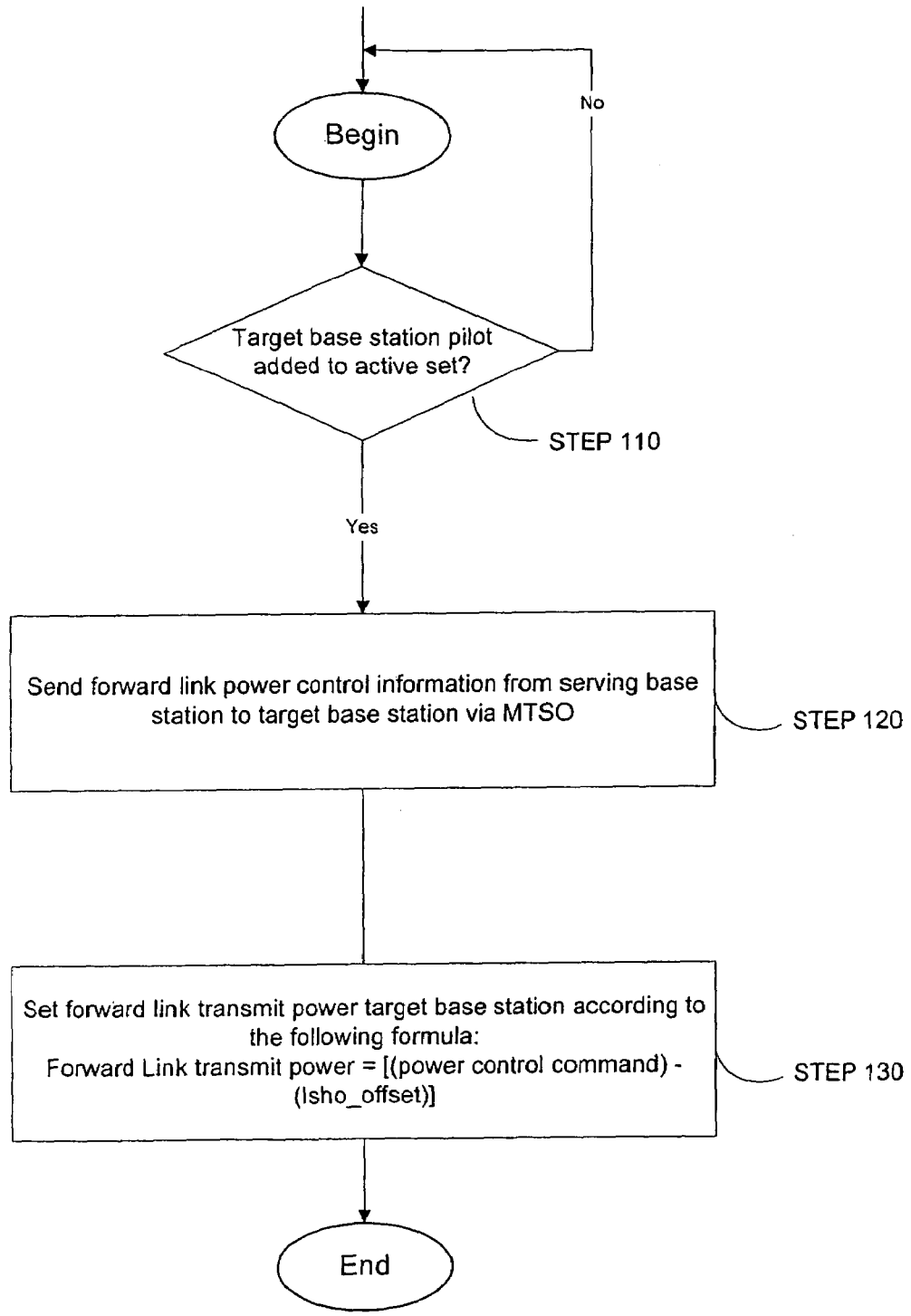
FIG. 7 shows a flowchart of an exemplary open loop method of the present invention.

FIG. 7 shows a flowchart of an exemplary open loop method of the present invention. As shown in FIG. 7, the exemplary open loop method 100 begins at a decision STEP 110 whereat the method determines whether a target base station pilot channel has been added to the active set. If the target base station pilot channel has not been added to the active set, the method returns to the decision STEP 110. If the target base station pilot channel has been added to the active set, the method proceeds to a STEP 120. The method transmits forward link power control information from a serving base station to the target base station via the MTSO. The method then proceeds to a STEP 130 whereat the target base station forward link transmit power is set according to Equation 1 below.

Forward link transmit power=[(power control command)−(Isho_offset)]   (Equation 1)

Power control commands are well known in the communication art and an example of a power control command is Service_fwd_pwr. Service_fwd_pwr is defined as the current transmit power setting of the serving base station forward traffic channel. Isho_offset is defined as a correction factor. Isho_offset is based upon a processing gain associated with the generation of the base station and a desired QoS. Utilizing the value of the Isho_offset, the forward link transmit power can be determined in accordance with the open loop method to limit signal interference to other mobile stations serviced by a target base station and while maintaining a desired QoS. One skilled in the communication art shall recognize that the open loop method can be utilized to control either the forward link power or to trigger an IHO.

When utilized to control the forward link power, the exemplary open loop method repeats STEPS 120–130 until the reverse link ISHO is terminated. The exemplary open loop method as utilized in conjunction with the exemplary intergenerational CDMA communication system of FIG. 6 is described below.

An exemplary open loop method of the present invention, as utilized in conjunction with the exemplary intergenerational CDMA communication system of FIG. 6, is now described in more detail. In the exemplary open loop method of the present invention, the mobile station 10 is in a softer ISHO scenario as described above with reference to (FIG. 5*a*). One skilled in the communication art shall recognize that this configuration is exemplary only and different configurations (e.g., a "soft" ISHO configuration (FIG. 5*b*)) can be utilized without departing from the scope or spirit of the present invention.

Referring again to FIG. 6, the mobile station 10 communicates with the serving base station 16 using the FTC 30 and the RTC 32. The mobile station 10 communicates with the target base station 18 via the FTC 40. Before an ISHO is performed, a pilot channel of the target base station 18 is added to the active set. In accordance with the exemplary open loop method 100 (described above with reference to FIG. 7), the method begins at the decision STEP 110 whereat the method determines whether a pilot channel of the target base station 18 has been added to the active set. The method proceeds to the STEP 120 when the pilot channel of the target base station 18 has been added to the active set. At the STEP 120, the method transmits forward link power control information from the serving base station 16 to the target base station 18 via the MTSO 20. The forward link power control information can be either the power control commands (e.g., Service_fwd_pwr) or the forward link transmit power (see Equation 1). After the STEP 120, the method proceeds to the STEP 130 whereat Equation 1 is utilized to determine and establish the forward link transmit power of the target base station 18.

In a first embodiment of the exemplary open loop method, the serving communication link 50 (FIG. 6) transmits power control command information (e.g., Service_fwd_pwr) to the MTSO 20. The method subsequently transmits the power control command information to the target base station 18 using the target communication link 52. At the STEP 130, the method utilizes Equation 1 to determine the forward link transmit power of the target base station 18.

In a second embodiment of the exemplary open loop method, the MTSO 20 receives the power control command information (e.g., Service_fwd_pwr) (over the serving communication link 50) and utilizes Equation 1 above to determine the forward link transmit power of the target base station 18. The method subsequently transmits the forward link transmit power information to the target base station 18 using the target communication link 52 (FIG. 6).

In a third embodiment of the present invention, the serving base station 16 utilizes Equation 1 (above) to determine the forward link transmit power of the target base station 18. The method subsequently transmits the forward link transmit power information to the target base station 18 using the serving communication link 50 and the target communication link 52 (FIG. 6).

As described above with reference to FIG. 7, the present inventive open loop embodiment determines a forward link transmit power of a target base station based upon a power control command value (e.g., Service_fwd_pwr) and an Isho_offset value. The above-described method can either control the forward link power of a target base station or trigger an ISHO procedure. One skilled in the communication art shall recognize that several different parameters can be used to control the forward link power or to trigger an ISHO procedure without departing from the scope or spirit of the present invention. One such embodiment of the present invention that utilizes an alternative parameter "average of a plurality of power control commands" (e.g., "Average Service_fwd_pwr") is now described.

Slow Forward Power Control Embodiment of the Present Invention

The slow forward power control embodiment of the present invention relies upon the observation that information regarding the serving forward traffic channel of a mobile station can be relayed to the target base station using the MSC. The slow forward power control embodiment of the present invention either controls the forward link transmit power of a target base station or triggers an ISHO procedure based upon a power control command value. The slow forward power control method utilizes these values to obtain a forward link transmit power of a target base station using statistical analysis. The present inventive slow forward power control embodiment can be utilized in ISHOs having intra-cell or inter-cell configurations. The slow forward power control embodiment can also be utilized in handing up (i.e., transferring service from a 2G CDMA system to a 3G CDMA system) or handing down (i.e., transferring service from a 3G CDMA system to a 2G CDMA system) a mobile station. In one embodiment, an "average of a plurality of power control commands" is obtained to determine the forward link transmit power when the method is handing down a mobile station. The slow forward power control method begins in a substantially similar manner to the open loop method described above with reference to FIG. 7 and thus similar STEPS are not described below.

Figure 8:
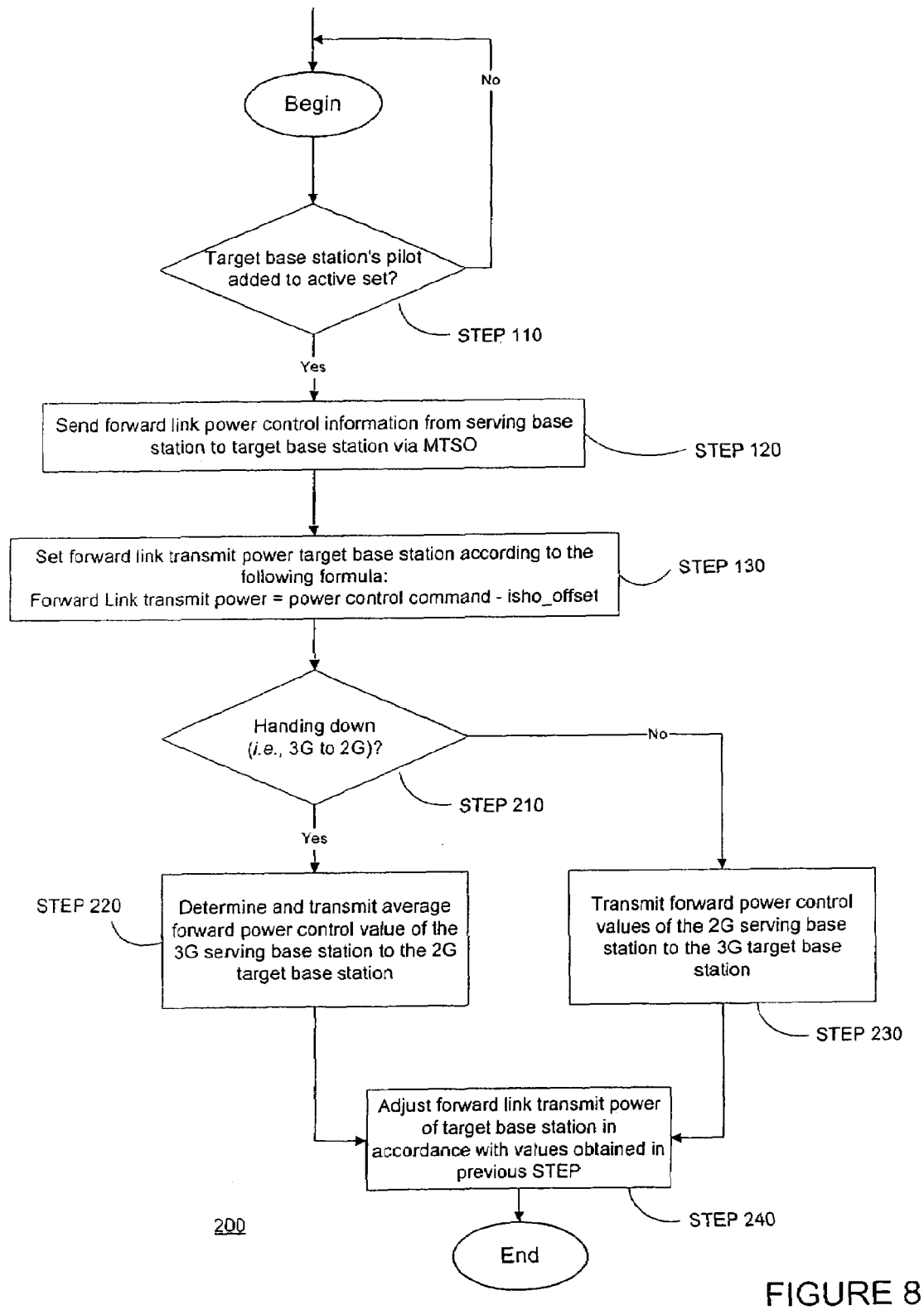
FIG. 8 shows a flowchart of an exemplary slow forward power control method of the present invention.

FIG. 8 shows a flowchart of an exemplary slow forward power control method of the present invention. As shown in FIG. 8, the exemplary slow forward power control method 200 begins at the decision STEP 110 whereat the method determines whether a target base station pilot channel has been added to the active set. If the target base station pilot channel has not been added to the active set, the method returns to the decision STEP 110. If the target base station pilot channel has been added to the active set, the method proceeds to a STEP 120 whereat the method transmits forward link power control information from a serving base station to the target base station via the MTSO. The method then proceeds to a STEP 130 whereat the target base station forward link transmit power is established in accordance with Equation 1 described above with reference to the open loop embodiment.

Referring again to FIG. 8, after the STEP 130, the method proceeds to a decision STEP 210. At the decision STEP 210, the method determines whether the serving base station is handing up or handing down a selected mobile station. If the serving base station is handing down (i.e., transferring service from a 3G system to a 2G CDMA system) the mobile station, the method proceeds to a STEP 220 whereat the method obtains an average forward power control value from a plurality of forward power control commands of the 3G serving base station that were transmitted during a given time interval (e.g., during a "frame"). The method transmits the average forward power control value of the 3G serving base station to the 2G target base station using the serving communication link 50 (FIG. 6) and the target communication link 52 (FIG. 6). If the serving base station is handing up (i.e., transferring from a 2G to 3G CDMA system) the mobile station, the method proceeds to a STEP 230 whereat the method transmits forward power control values of the 2G serving base station to the 3G target base station via the serving communication link 50 and the target communication link 52 (FIG. 6). The method proceeds to a STEP 240 whereat the method adjusts the forward link transmit power of the target base station based upon the values determined in the previous step (i.e., determined at STEP 220 or at STEP 230).

When utilized to control the forward link power levels, the exemplary slow forward power control method repeats STEPS 210–240 until the reverse link ISHO terminates. After completion of a 3G to 2G reverse link ISHO, forward link power is controlled through the frame error rate (FER) for rate set 1 and erasure indicator bit (EIB) reporting for rate set 2 as specified in the incorporated IS-95A and IS-95B. After completion of a 2G to 3G reverse link ISHO, forward link power is 800 Hz for non-EIB or 50 Hz for EIB as specified in the incorporated IS-2000. The exemplary slow forward power control method as utilized in conjunction with the exemplary intergenerational CDMA communication system, is now described.

To facilitate a better understanding of the present invention, the exemplary slow forward power control method as utilized in conjunction with the exemplary intergenerational CDMA communication system of FIG. 6, is now described in more detail. In the exemplary slow forward power control method, the mobile station 10 can be in a "softer" ISHO configuration (FIG. 5a), a "soft" ISHO configuration (FIG. 5b) or a "soft-softer" ISHO configuration (FIG. 5c). One skilled in the art shall recognize that the exemplary slow forward power control method can be utilized with a number of different ISHO configurations without departing from the scope or spirit of the present invention.

Referring again to FIG. 6, the mobile station 10 communicates with the serving base station 16 using the FTC 30 and the RTC 32. The mobile station 10 communicates with the target base station 18 using the FTC 40. In accordance with the present exemplary slow forward power control method, the serving base station is a 3G system and the target base station is a 2G system. Before an ISHO is performed, a pilot signal of the target base station 18 is added to the active set. In accordance with the exemplary slow forward power control method 200 (FIG. 8), the method begins at the decision STEP 110 whereat the method determines whether a pilot channel of the target base station 18 has been added to the active set. The method proceeds to the STEP 120 when the pilot of the target base station 18 is added to the active set. At the STEP 120, the method transmits forward link power control information from the serving base station 16 to the target base station 18 using the MTSO 20 (FIG. 6). The forward link power control information can comprise either the power control commands, "Service_fwd_pwr" or the forward link transmit power (Equation 1). After the STEP 120, the method proceeds to the STEP 130 whereat Equation 1 is used to determine and set the forward link transmit power of the target base station 18.

After the STEP 130, the method proceeds to the decision STEP 210 whereat the method determines whether the mobile station 10 is being "handed down". In the present exemplary communication system of the slow forward power control embodiment of the present invention, the mobile station 10 is handed down because the serving base station 16 is a 3G system and the target base station 18 is a 2G system. Thus, the method proceeds to the STEP 220 whereat the method determines an average forward power control value from a plurality of forward power control commands of the 3G serving base station 16 that were transmitted during a selected time interval (e.g., a "frame"). In the present exemplary communication system of the slow forward power control embodiment of the present invention, an average of the plurality of power control commands (e.g., Average Service_fwd_pwr value) over a frame is utilized to control the forward link transmit power of the target base station 18. The method then transmits this average of the plurality of power control commands to the target base station 18 via the serving communication link 50 and the target communication link 52 (FIG. 6). The average of the plurality of power control commands can be determined by the serving base station 16, the MTSO 20 or the target base station 18. The method proceeds to a STEP 240 whereat the forward link transmit power of the target base station is adjusted based upon the values determined at the STEP 220.

As described above with reference to FIG. 8, the present inventive slow forward power control embodiment determines a forward link transmit power of a target base station based upon power control command values and an "Isho_offset" value. The above-described method can control forward link power of a target base station or can be used to trigger an ISHO procedure. One skilled in the communication art shall recognize that alternative methods can be used to transmit forward link power control information of a serving base station to a target base station without departing from the scope or spirit of the present invention. One such embodiment of the present invention that uses a direct reception of forward link power control information is now described.

Reverse Traffic Channel Demodulation Embodiment of the Present Invention

The Reverse Traffic Channel (RTC) demodulation embodiment of the present invention either controls the forward link transmit power of a target base station or triggers an ISHO procedure. The ISHO procedure is based upon a plurality of power control commands that are transmitted to a target base station directly from a selected mobile station. The RTC demodulation embodiment relies upon an observation that a 3G target base station can demodulate an RTC of a mobile station currently being handed up from a 2G serving base station. The present inventive RTC demodulation embodiment can be used in ISHO procedures having intra-cell or inter-cell configurations. In one embodiment, the RTC demodulation method is substantially similar to the open loop method described above with reference to FIG. 7 and thus similar STEPS are not described in detail. In another embodiment, the RTC demodulation method is substantially similar to the slow forward power control method described above with reference to FIG. 8 and thus similar STEPS are not described.

Figure 9:
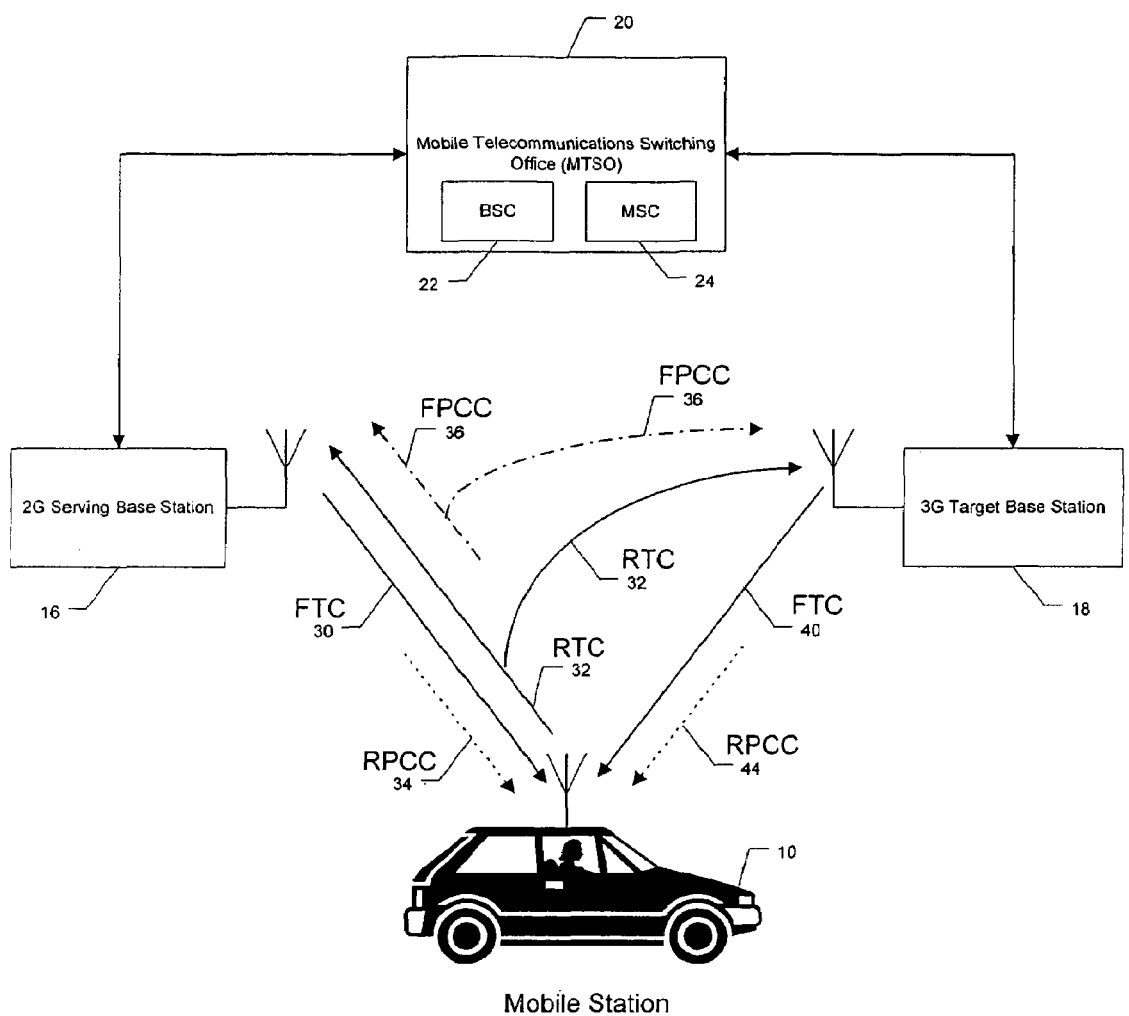
FIG. 9 shows a CDMA system using an exemplary RTC demodulation configuration of the present invention.

FIG. 9 shows a CDMA system using an exemplary RTC demodulation configuration of the present invention. The CDMA system of FIG. 9 is substantially similar to the exemplary intergenerational CDMA communication system of FIG. 6 and thus like elements are not described in more detail. As shown in FIG. 9, the 3G target base station 18 can receive and demodulate the RTC 32 and the FPCC 36 transmitted by the mobile station 10. The FPCC 36 includes information that the 3G target base station 18 can use in performing the RTC demodulation method of the present invention.

In a first embodiment of the RTC demodulation method, the 3G target base station 18 performs the open loop method described above with reference to FIG. 7. Specifically, the 3G target base station 18 performs the STEPS 110–130 as described above with reference to FIGS. 7 and 9.

In a second embodiment of the RTC demodulation method, the 3G target base station 18 performs the slow forward power control method described above with reference to FIG. 8. Specifically, the 3G target base station 18 performs the STEPS 120 and 230 as described above with reference to FIG. 8. The STEPS 210 and 220 (of FIG. 8) are not performed in this embodiment. One skilled in the communication art shall recognize that the mobile station 10 is being handed up and thus the STEPS 210 and 220 are unnecessary. However, the STEPS 110, 130 and 240 are performed by the 3G target base station 18 as described above with reference to FIGS. 8 and 9.

The present inventive RTC demodulation embodiment controls the forward link transmit power of a target base station by directly demodulating an RTC of a mobile station and obtaining the plurality of power control commands. The RTC demodulation embodiment can be used in a mobile station that is currently being handed up from a 2G serving base station to a 3G target base station.

In summary, the forward link power control method and apparatus of the present invention determines acceptable forward link power levels of a target base station during intergenerational soft handoffs (ISHOs). The method and apparatus of the present invention controls the forward link power of the target base station during ISHOs (specifically, during the forward link ISHO portion of an ISHO). Three embodiments of the present invention have been described. The open loop and slow forward power control embodiments of the present invention rely upon an observation that information regarding a mobile station serving forward traffic channel can be communicated to the target base station using an MSC. Specifically, in the open loop embodiment, "Service_fwd_pwr" values and an "Isho_offset" value are used to determine the forward link transmit power of a selected target base station. Specifically, in the slow forward power control embodiment, a statistical value, such as an average of a plurality of power control commands over a given time interval, can be used to determine the forward link transmit power of a selected target base station. The RTC demodulation embodiment controls the forward link transmit power of a target base station by directly demodulating an RTC of a mobile station thereby obtaining the plurality of power control commands.

The method and apparatus of the present invention improves the performance, QoS, and capacity of a CDMA system when a complete intergenerational handoff (i.e., an intergenerational handoff performed in both the forward and reverse links) is performed. Specifically, the present inventive method and apparatus decreases the probability of degrading a communication system QoS and capacity when an intergenerational soft handoff is performed.

A number of embodiments of the present invention have been described. Nevertheless, it will be understood that various modifications may be made without departing from the spirit and scope of the invention. For example, the open loop embodiment of the present method and apparatus can either be performed within the target base station, the MTSO or the serving base station.

Accordingly, it is to be understood that the invention is not to be limited by the specific illustrated embodiment, but only by the scope of the appended claims.

What is claimed is:

1. A method of controlling forward link power during intergenerational soft handoff ("ISHO") procedures in a wireless communication system, wherein the wireless communication system includes a plurality of base stations in communication with at least one mobile station, wherein the base stations transmit information to the at least one mobile station via a forward link, and wherein the base stations receive information from the at least one mobile station via a reverse link, and wherein each base station is in communication with a mobile station controller (MSC), and wherein a selected mobile station is handed off from a serving communication system to a target communication system, and wherein the serving and target systems comprise different generational CDMA communication systems, comprising the steps of:

a) determining a forward link transmit power of a serving communication system;
  b) calculating a forward link transmit power of a target system, including subtracting an ISHO offset from the forward link transmit power of the serving communication system determined during step (a); and
  c) controlling the forward link transmit power of the target system based upon the forward link transmit power calculated during step (b).

2. The method of controlling forward link power during ISHO procedures as defined in claim 1, wherein the serving communication system comprises a serving base station.

3. The method of controlling forward link power during ISHO procedures as defined in claim 2, wherein the target communication system comprises a target base station.

4. The method of controlling forward link power during ISHO procedures as defined in claim 1, wherein the step (a) of determining a forward link transmit power comprises determining an actual transmit power of the serving system.

5. The method of controlling forward link power during ISHO procedures as defined in claim 4, wherein the ISHO offset is determined by a selected Quality of Service (QoS).

6. The method of controlling forward link power during ISHO procedures as defined in claim 4, wherein the calculating step (b) is performed at the serving system and transmitted to the target system using a serving communication link and a target communication link.

7. The method of controlling forward link power during ISHO procedures as defined in claim 4, wherein the calculating step (b) is performed by an MSC associated with the serving and target systems, and subsequently transmitted to the target system using a target system communication link.

8. The method of controlling forward link power during ISHO procedures as defined in claim 4, wherein the calculating step (b) is performed at the target communication system.

9. The method of controlling forward link power during ISHO procedures as defined in claim 1, wherein the method further includes the step (d) of performing a reverse link hard handoff procedure.

10. The method of controlling forward link power during ISHO procedures as defined in claim 1, wherein the forward link transmit power is controlled during an ISHO procedure, and wherein the handoff procedure comprises a soft handoff.

11. The method of controlling forward link power during ISHO procedures as defined in claim 1, wherein the forward link transmit power is controlled during an ISHO procedure, and wherein the handoff procedure comprises a softer handoff.

12. The method of controlling forward link power during ISHO procedures as defined in claim 1, wherein the forward link transmit power is controlled during an ISHO procedure, and wherein the handoff procedure comprises a soft-softer handoff.

13. The method of controlling forward link power during ISHO procedures as defined in claim 1, further including the steps of:
  i) calculating a power transmit value based upon information obtained from a plurality of forward power control commands transmitted by a selected mobile station to the serving system; and
  ii) adjusting the forward link transmit power of the target system based upon the power transmit value calculated in step (i).

14. The method of claim 13, wherein the step (i) of calculating a power transmit value comprises the steps of:
  A) determining if a selected mobile station is handed down from a 3G serving system to a 2G target system;
  B) calculating the power transmit value based upon a statistical average of transmit power settings of the serving base station forward traffic channel, and transmitting the power transmit value to a 2G target base station if the mobile station is determined to be handed down during step (A); and
  C) if the selected mobile station is not handed down, calculating the power transmit value based upon a plurality of forward power control commands transmitted to a 3G target base station.

15. The method of claim 14, wherein the step (B) of calculating the power transmit value based upon a statistical average of transmit power settings is determined by averaging a plurality of power control command values during a selected frame.

16. The method of claim 14, wherein the serving system is a 3G CDMA system and the target system is a 2G CDMA system.

17. The method of claim 16, wherein the method further includes the step of controlling the forward link transmit power through FER for a rate set 1.

18. The method of claim 16, wherein the method further comprises the step of controlling the forward link power control through EIB reporting for a rate set 2.

19. The method of claim 14, wherein the serving system is a 2G CDMA system and the target system is a 3G CDMA system.

20. The method of controlling forward link power during ISHO procedures as defined in claim 1, wherein the step (b) of calculating a forward link transmit power of a target system includes the sub-steps of:
  i) demodulating a reverse traffic channel of the serving system, wherein the serving system comprises a 2G CDMA system; and
  ii) calculating the forward link transmit power of the target system based upon information obtained from the reverse traffic channel of the 2G CDMA serving system.

21. The method of claim 20, wherein the sub-step (i) comprises determining a power control command value of the 2G CDMA serving system.

22. The method of claim 20, wherein the method further includes the sub-steps of:
  iii) calculating a power transmit value based upon information obtained from a plurality of forward power control commands transmitted from the mobile station to the serving system; and
  iv) adjusting the forward link transmit power of the target system based upon the power transmit value calculated in sub-step (iii).

23. The method of claim 22, wherein the sub-step (iii) comprises the sub-steps of:
  A) determining whether a mobile station is handed down;
  B) calculating the power transmit value based upon a statistical average of transmit power settings of the serving base station forward traffic channel, and transmitting the power transmit value to a 2G target base station if the mobile station is determined to be handed down during sub-step (A); and
  C) if the selected mobile station is not handed down, calculating the power transmit value based upon a plurality of forward power control commands transmitted to a 3G target base station.

24. An apparatus for controlling forward link power control during a handoff between a serving system and a target system in a CDMA communication system utilizing a plurality of base stations in communication with at least one mobile station, wherein each base station communicates with a mobile station controller, and wherein the serving system and the target system comprise different CDMA generations, comprising:
  a) a serving system forward power calculation module configured to determine a serving forward link transmit power associated with the serving system;
  b) a target system forward power calculation module configured to calculate a target forward link transmit power associated with the target system, wherein the calculated target forward link transmit power is related to the serving forward link transmit power determined in step (a) by subtraction of an ISHO offset value therefrom; and c) a target system forward power instruction module, responsive to the target system forward power calculation module, for controlling the target forward link transmit power.

25. A computer program executable on a general purpose computing device, wherein the program is capable of controlling forward link power during a handoff between a serving system and a target system in a CDMA communication system having a plurality of base stations in communication with at least one mobile station, and wherein each base station communicates with a mobile station controller, and wherein the serving system and the target system comprise different CDMA generations, comprising:

a) a first set of instructions for determining a forward link transmit power of a serving communication system;

b) a second set of instructions for calculating a forward link transmit power of a target system based upon the forward link transmit power of the serving communication system reduced by an ISHO offset value; and c) a third set of instructions for controlling the forward link transmit power of the target system.

* * * * *